(12) United States Patent
Stefani

(10) Patent No.: US 8,260,536 B2
(45) Date of Patent: Sep. 4, 2012

(54) ROAD VEHICLE MOTORING AID METHOD AND SYSTEM

(75) Inventor: Giovanni Stefani, Sassuolo (IT)

(73) Assignee: Ferrari S.p.A., Modena (IT)

( * ) Notice: Subject to any disclaimer, the term of this patent is extended or adjusted under 35 U.S.C. 154(b) by 707 days.

(21) Appl. No.: 12/297,050

(22) PCT Filed: Apr. 13, 2007

(86) PCT No.: PCT/IB2007/000972
§ 371 (c)(1),
(2), (4) Date: May 27, 2009

(87) PCT Pub. No.: WO2007/119153
PCT Pub. Date: Oct. 25, 2007

(65) Prior Publication Data
US 2010/0017111 A1    Jan. 21, 2010

(30) Foreign Application Priority Data
Apr. 13, 2006  (IT) .............. BO2006A0282

(51) Int. Cl.
*G01C 21/00* (2006.01)

(52) U.S. Cl. .............. 701/201; 701/418; 701/436

(58) Field of Classification Search .......... 353/79; 701/15, 211, 301
See application file for complete search history.

(56) References Cited

U.S. PATENT DOCUMENTS

| | | | |
|---|---|---|---|
| 2004/0036845 A1* | 2/2004 | Hoffmeister et al. | 353/79 |
| 2005/0165550 A1* | 7/2005 | Okada | 701/301 |
| 2005/0171654 A1* | 8/2005 | Nichols et al. | 701/15 |
| 2006/0142941 A1* | 6/2006 | Imai et al. | 701/211 |

FOREIGN PATENT DOCUMENTS

| | | |
|---|---|---|
| DE | 10034381 | 1/2002 |
| DE | 10134594 | 1/2003 |
| EP | 1334869 | 8/2003 |

OTHER PUBLICATIONS

International Search Report for Application Serial No.: PCT/IB2007/000972; European Patent Office Oct. 15, 2007.

\* cited by examiner

*Primary Examiner* — Valerie Lubin
(74) *Attorney, Agent, or Firm* — Graybeal Jackson LLP

(57) ABSTRACT

An embodiment of a motoring aid method and system for a road vehicle, whereby a motoring aid information item is generated as the road vehicle travels along a road having a road surface; the information is converted into a graphic display image; and the image is projected onto a portion of the road surface ahead of the road vehicle, to allow the driver of the road vehicle to view the image without distracting the driver's attention from the road.

32 Claims, 3 Drawing Sheets

ROAD VEHICLE MOTORING AID METHOD AND SYSTEM

PRIORITY CLAIM

The present application is a United States national phase application filed pursuant to 35 USC §371 of International Patent Application Serial No.: PCT IB2007/000972, filed Apr. 13, 2007; which application claims priority to Italian Patent Application Serial No.: BO2006A000282, filed Apr. 13, 2006; all of the foregoing applications are incorporated herein by reference in their entireties.

TECHNICAL FIELD

An embodiment relates to a road vehicle motoring aid method and system.

An embodiment may be used to advantage in a car, to which the following description refers purely by way of example.

BACKGROUND

Progress in electronic systems has resulted in a steady increase over the past few years in the amount of information supplied to car drivers, and therefore in a growing need to organize and display this information for quick access by the driver without overly distracting the driver's attention from the road.

The problem of displaying information without distracting the driver's attention from the road applies in particular to GPS navigation systems, which indicate routes using data supplied by a satellite positioning device. In fact, the tendency is for drivers to focus their attention continually on the route mapped on the GPS screen, as opposed to road traffic conditions, with obvious risks in terms of safety. It is important to note that, to monitor the GPS screen, the driver typically must look away from the road, and switching back and forth between the road and screen takes time for the driver's eyes to adapt to different focal lengths, which may be particularly slow in the case of elderly drivers.

By way of a solution to the problem, GPSs with a voice capability have been proposed, to communicate the route vocally to the driver. The effectiveness of voice communication, however, is limited, in that the driver still tends to monitor the GPS screen.

Another proposed solution is an HUD (Heads-Up Display) system, which projects an electronic image of the GPS-generated route information onto the windshield of the car, so the driver can read the projected information without looking away from the windshield, i.e. the road.

Installing an HUD system in a car, however, is an expensive process, and is therefore limited to a small number of top-range models. One of the major problems in installing an HUD system in a car is caused by flaws in the windshield, which, though not noticeable when observing the road through the windshield, may introduce unacceptable distortion of the projected images. As a result, the windshield (which has an extensive surface area and highly complex curved shape) often must be made to strict manufacturing specifications involving a considerable increase in cost and rejects.

Moreover, in normal driving conditions, the driver's head and, therefore, eyes are subject to continual vertical and horizontal bobbing movements induced by vibration of the car, so the driver's eyes must keep continual track of the position of the image projected on the windshield, thus making monitoring of the image awkward.

DE10034381 discloses an information display system for use in a road vehicle and having an image data projected onto a road surface in front of the vehicle.

DE10134594 discloses a lighting system for assisting a vehicle driver and having a lighting unit, a unit to modulate lighting, sensors to detect a driving situation and a control unit to control lighting modulation through a detected driving situation.

EP1334869 discloses a beam radiator that radiates visible light beams having a predetermined wavelength onto a road surface to inform drivers of other vehicles of the existence of a vehicle or to let a driver of the vehicle confirming a traveling path thereof.

SUMMARY

An embodiment is a road vehicle motoring aid method and system designed to eliminate the aforementioned drawbacks, and which are cheap and easy to implement.

BRIEF DESCRIPTION OF THE DRAWINGS

One or more non-limiting embodiments will be described by way of example with reference to the accompanying drawings, in which.

DETAILED DESCRIPTION

Figure 1:
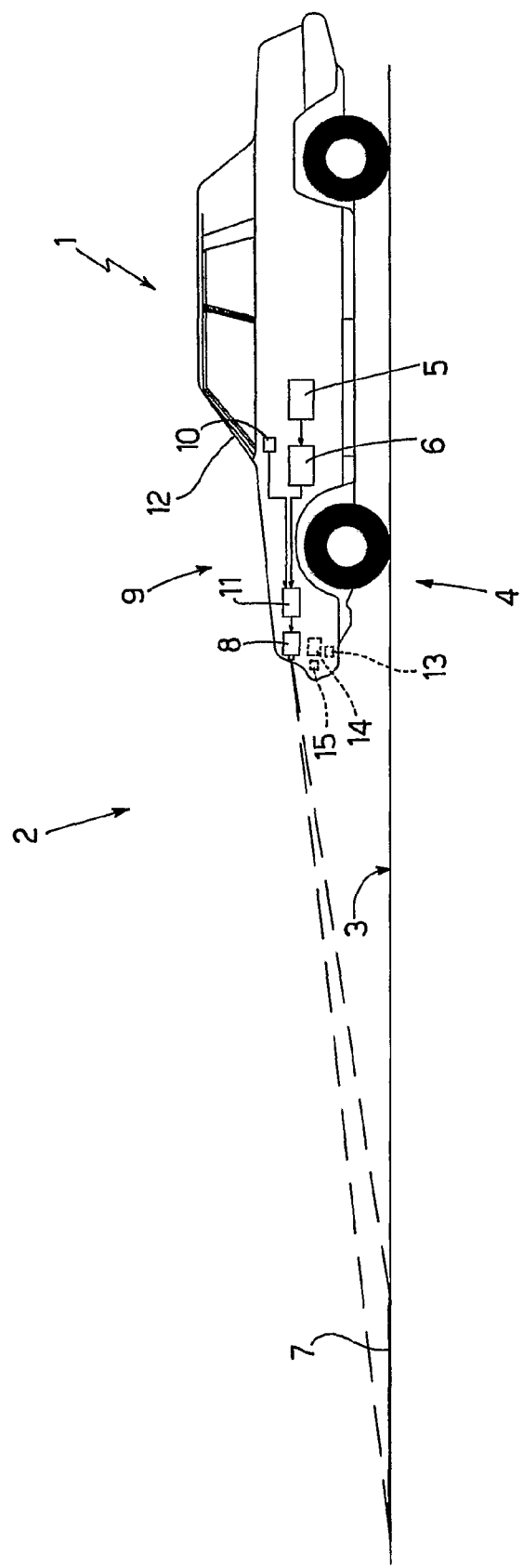
FIG. 1 shows a schematic side view of a car equipped with a motoring aid system in accordance with an embodiment.

Number 1 in FIG. 1 indicates a car travelling along a road 2 having a road surface 3.

Car 1 is equipped with a motoring aid system 4 comprising an electronic device 5, which generates motoring aid information as car 1 travels along road 2. Electronic device 5 typically incorporates or is connected or coupled to a GPS navigation system, which indicates the route to a given destination using data supplied by a satellite positioning device, so at least part of the information supplied by electronic device 5 relates to a route to be followed. Electronic device 5 is designed to process any type of motoring aid information, such as vehicle information (travelling speed, engine speed, currently engaged gear, faults . . . ) or traffic condition information.

Motoring aid system 4 comprises a further electronic device 6, which receives and converts the information from electronic device 5 into a succession of typically dot-matrix graphic display images 7.

Electronic device 6 controls at least one laser projector 8 located at the front of car 1 and normally integrated in a front optical assembly of car 1. Using laser light, projector 8 projects the image 7 from electronic device 6 onto a portion of road surface 3 ahead of car 1, to enable the driver of car 1 to view image 7 without looking away from road 2.

Motoring aid system 4 comprises a compensating device 9 for compensating the body movements of car 1 to stabilize image 7 projected by projector 8.

In a first embodiment, projector 8 is float-mounted to a frame of car 1; and compensating device 9 is passive, and comprises a mechanical damper interposed between the frame and projector 8, so that projector 8 follows the movements of car 1 slowly, and is not noticeably affected by the body movements of car 1.

In a second embodiment, compensating device 9 is active, and comprises a sensor 10 for detecting the body movements of car 1; and a mechanical actuator controlled by the signal from sensor 10 to apply compensating movements, equal and opposite to the body movements of car 1, to projector 8.

In a third embodiment shown in FIG. 1, compensating device 9 is active, and comprises sensor 10 for detecting the body movements of car 1; and a third electronic device 11 controlled by the signal from sensor 10 to modify image 7 by applying compensating movements, equal and opposite to the body movements of car 1, to image 7.

In one possible embodiment, projector 8 uses light of a given wavelength to project image 7 onto a portion of road surface 3; and the windshield 12 of car 1 is treated to enhance viewing of the projector 8 wavelength, so image 7 is clearly visible by the driver without recourse to excessively strong light to project image 7, which could annoy other road-users. A cheaper alternative than treating the whole of windshield 12 of car 1 is to provide the driver with goggles (or additional lenses which fit onto normal glasses) treated to enhance viewing of the projector 8 wavelength.

In one possible embodiment, motoring aid system 4 comprises a further sensor 13 for determining the lay of road surface 3 ahead of car 1; and an electronic device 14 for accordingly modifying image 7 to adapt image 7 to the lay of road surface 3. In other words, sensor 13 and electronic device 14 combine to take into account whether road surface 3 is flat, uphill, or downhill. In one possible embodiment, sensor 13 may determine the inclination to the horizontal of car 1.

In one possible embodiment, motoring aid system 4 comprises a sensor 15 for determining whether the road 2 ahead of car 1 is clear. Sensor 15 is connected to projector 8, which only projects image 7 onto road surface 3 ahead of car 1 if road surface 3 is clear, thus preventing projection of image 7 onto another vehicle in front of car 1. In which case, in fact, image 7 would be illegible, and may result in reflection annoying the driver of car 1.

In one possible embodiment, motoring aid system 4 determines the travelling speed of car 1, and accordingly adjusts the projection distance of image 7 (i.e. the distance between image 7 and car 1). More specifically, the projection distance of image 7 is adjusted in direct proportion to the travelling speed of car 1, i.e. the faster the travelling speed of car 1, the greater the projection distance of image 7.

In one possible embodiment, motoring aid system 4 determines the steering angle of car 1, and accordingly adjusts the transverse position of image 7.

Figure 2:
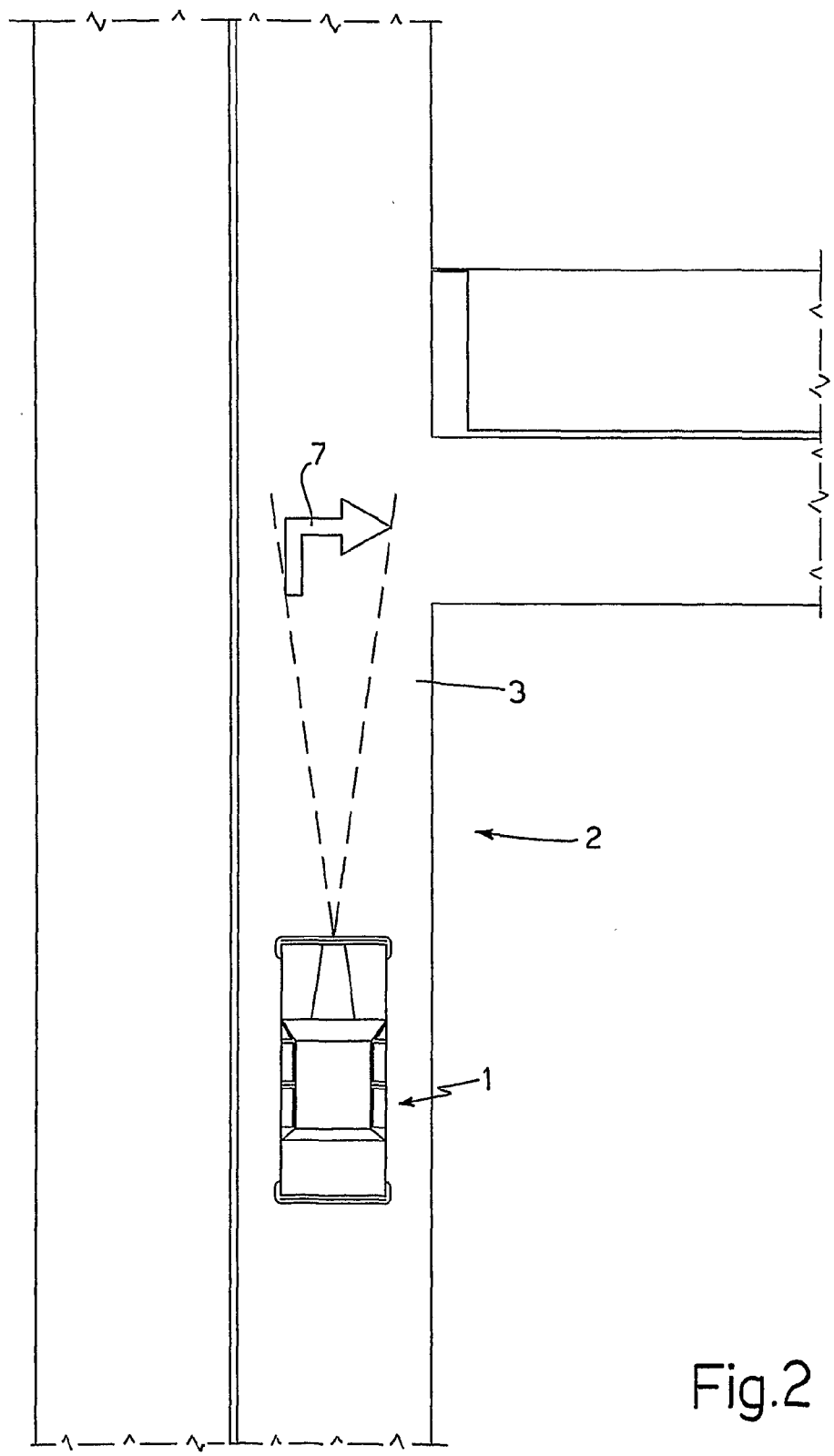
FIG. 2 shows a schematic plan view of the FIG. 1 car on open road.

In FIG. 2, car 1 is shown travelling along an open road 2, and image 7 projected by motoring aid system 4 comprises an ideogram indicating the direction to be followed along the desired route. In this case, electronic device 5 acquires the destination of car 1; determines the route to reach the destination; and generates information to display the route to the destination graphically on road surface 3 ahead of car 1. In addition to the ideogram, image 7 may also comprise a distance indication indicating the distance at which to perform the instruction in the ideogram.

Figure 3:
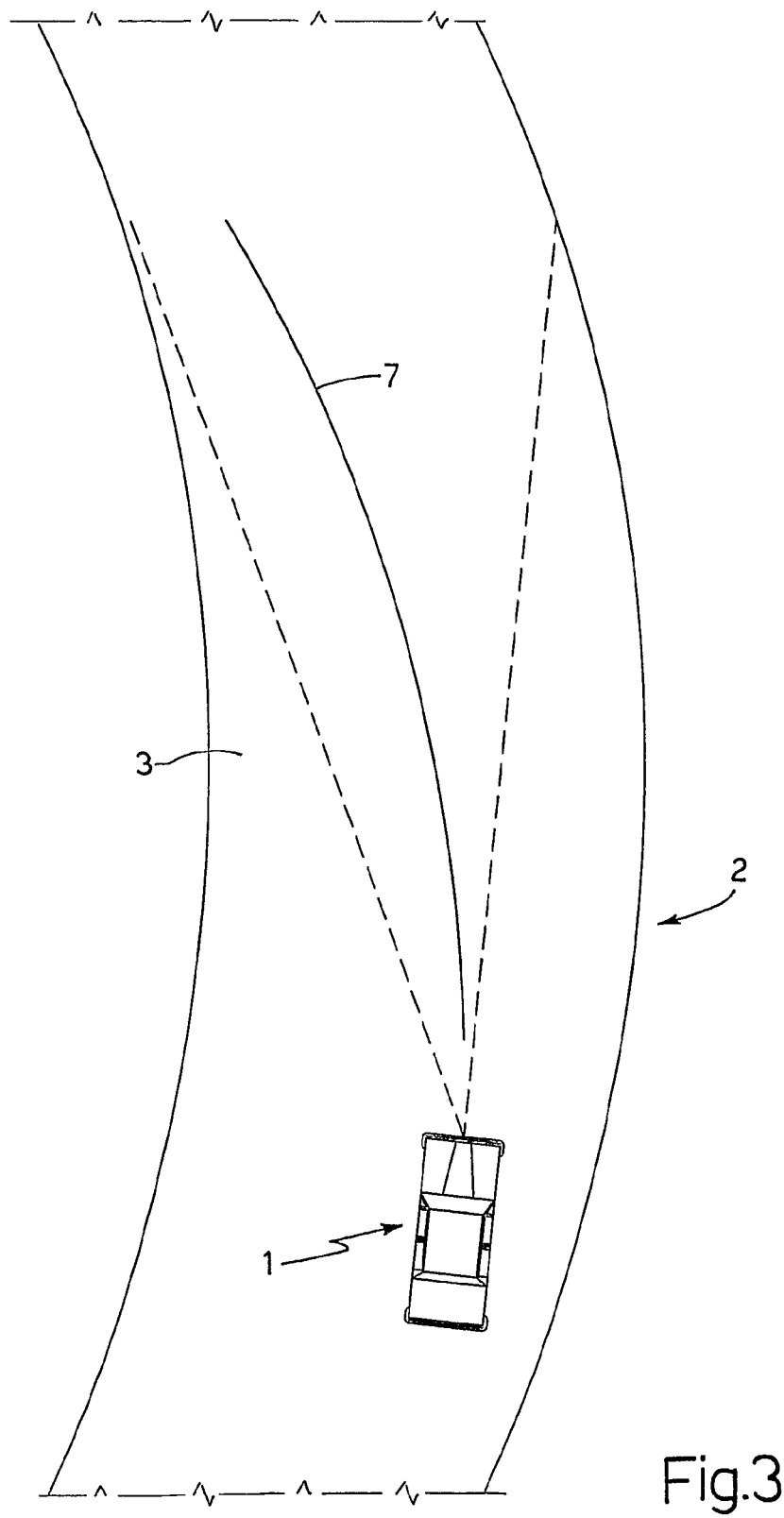
FIG. 3 shows a schematic plan view of the FIG. 1 car on track.

In FIG. 3, car 1 is shown on track closed to traffic, and image 7 projected by motoring aid system 4 comprises an ideal trajectory to maximize on-track speed. In this case, electronic device 5 determines the ideal trajectory, and generates information to display the ideal trajectory graphically on road surface 3 ahead of car 1. Image 7 typically comprises a line indicating the ideal trajectory, and, in addition to the continuous line, may also comprise a best-braking-point indication.

One or more of the embodiments of the motoring aid system 4 as described above has numerous advantages, by being cheap and easy to implement, and enabling information access by the driver of car 1 without distracting the driver's attention from road 2.

From the foregoing it will be appreciated that, although specific embodiments have been described herein for purposes of illustration, various modifications may be made without deviating from the spirit and scope of the present disclosure.

The invention claimed is:

1. A motoring aid method for a road vehicle; the method comprising the steps of:
    generating, using a first electronic device, at least one motoring aid information item as the road vehicle travels along a road having a road surface;
    converting, using a second electronic device connected to the first electronic device, the information into a graphic display image; and
    projecting, using a projector arranged in the front side of the road vehicle and connected to the second electronic device, the image onto a portion of the road surface ahead of the road vehicle, to allow the driver of the road vehicle to view the image without distracting the driver's attention from the road; and
    compensating, using a compensating device connected to the second electronic device or to the projector, the body movements of the road vehicle to stabilize the image.

2. A method as claimed in claim 1, wherein the step of generating the information comprises the further steps of:
    acquiring a destination of the road vehicle;
    determining a route to reach the destination; and
    generating information to display the route to the destination graphically on the road surface ahead of the road vehicle.

3. A method as claimed in claim 2, wherein the image comprises an ideogram indicating the direction to take to follow the desired route.

4. A method as claimed in claim 3, wherein the image comprises a distance indication.

5. A method as claimed in claim 1, wherein the step of generating the information comprises the further steps of:
    determining an ideal trajectory; and
    generating the information to display the ideal trajectory graphically on the road surface ahead of the road vehicle.

6. A method as claimed in claim 5, wherein the image comprises a line indicating the ideal trajectory.

7. A method as claimed in claim 5, wherein the image comprises a best braking point.

8. A method as claimed in claim 1, wherein the step of compensating the body movements of the road vehicle comprises passive compensation, by float-mounting to a frame of the road vehicle a projector for projecting the image, and by interposing a mechanical damper between the frame and the projector.

9. A method as claimed in claim 1, wherein the step of compensating the body movements of the road vehicle comprises active compensation, by detecting the body movements of the road vehicle, and by physically applying to a projector, for projecting the image, compensating movements equal and opposite to the body movements of the road vehicle.

10. A method as claimed in claim 1, wherein the step of compensating the body movements of the road vehicle comprises active compensation, by detecting the body movements of the road vehicle, and by adjusting the image by applying to the image compensating movements equal and opposite to the body movements of the road vehicle.

11. A method as claimed in claim 1, wherein the step of projecting the image onto a portion of the road surface comprises the further step of employing a laser projector emitting laser light.

12. A method as claimed in claim 1, wherein the image projected onto the road surface is constructed using a dot matrix.

13. A method as claimed in claim 1, wherein the image is projected onto a portion of the road surface using light of a given wavelength; and the windshield of the road vehicle is treated to enhance viewing of the wavelength used to project the image.

14. A method as claimed in claim 1, wherein the image is projected onto a portion of the road surface using light of a given wavelength; and the driver of the road vehicle is provided with goggles treated to enhance viewing of the wavelength used to project the image.

15. A method as claimed in claim 1, wherein the step of projecting the image onto a portion of the road surface comprises the further steps of:
- determining the lay of the road surface ahead of the road vehicle; and
- adjusting the image as a function of the lay of the road surface ahead of the road vehicle to adapt the image to the lay of the road surface.

16. A method as claimed in claim 1, wherein a projector for projecting the image is located inside a front optical assembly of the road vehicle.

17. A method as claimed in claim 1, and comprising the further steps of:
- determining whether the road ahead of the road vehicle is clear; and
- only projecting the image onto the road surface ahead of the road vehicle if the road surface is clear.

18. A method as claimed in claim 1, and comprising the further steps of:
- determining the travelling speed of the road vehicle; and
- adjusting the projection distance of the image as a function of the travelling speed of the road vehicle.

19. A method as claimed in claim 18, wherein the projection distance of the image is adjusted in direct proportion to the travelling speed of the road vehicle.

20. A method as claimed in claim 1, and comprising the further steps of:
- determining a steering angle of the road vehicle; and
- adjusting the transverse position of the image as a function of the steering angle of the road vehicle.

21. A motoring aid system for a road vehicle the system comprising:
- a first electronic device for generating at least one motoring aid information item as the road vehicle travels along a road having a road surface;
- a second electronic device for converting the information into a graphic display image;
- a projector for projecting the image onto a portion of the road surface ahead of the road vehicle, to allow the driver of the road vehicle to view the image without distracting the driver's attention from the road; and
- a compensating device for compensating the body movements of the road vehicle to stabilize the image projected by the projector.

22. A system as claimed in claim 21, wherein the projector is float-mounted to a frame of the road vehicle; and the compensating device is passive, and comprises a mechanical damper interposed between the frame and the projector.

23. A system as claimed in claim 21, wherein the compensating device is active, and comprises a first sensor for detecting the body movements of the road vehicle; and a mechanical actuator for applying to the projector compensating movements equal and opposite to the body movements of the road vehicle.

24. A system as claimed in claim 21, wherein the compensating device is active, and comprises a first sensor for detecting the body movements of the road vehicle; and a third electronic device for adjusting the image by applying to the image compensating movements equal and opposite to the body movements of the road vehicle.

25. A system as claimed in claim 21, wherein the projector is a laser projector emitting laser light.

26. A system as claimed in claim 21, wherein the projector uses light of a given wavelength to project the image onto a portion of the road surface; and the windshield of the road vehicle is treated to enhance viewing of the wavelength used to project the image.

27. A system as claimed in claim 21, wherein the projector uses light of a given wavelength to project the image onto a portion of the road surface; and the system comprises, for the driver of the road vehicle, goggles treated to enhance viewing of the wavelength used to project the image.

28. A system as claimed in claim 21, and comprising a second sensor for determining the lay of the road surface ahead of the road vehicle; and a fourth electronic device for adjusting the image as a function of the lay of the road surface ahead of the road vehicle to adapt the image to the lay of the road surface.

29. A system as claimed in claim 21, wherein the projector is located inside a front optical assembly of the road vehicle.

30. A road vehicle featuring the motoring aid system as claimed in claim 21.

31. A motoring aid method for a road vehicle; the method comprising the steps of:
- generating, using a first electronic device, at least one motoring aid information item as the road vehicle travels along a road having a road surface, wherein the motoring aid information comprises a best braking point;
- converting, using a second electronic device connected to the first electronic device, the information into a graphic display image so as the best braking point is inserted in the image; and
- projecting, using a projector arranged in the front side of the road vehicle and connected to the second electronic device, the image onto a portion of the road surface ahead of the road vehicle, to allow the driver of the road vehicle to view the image without distracting the driver's attention from the road.

32. A motoring aid method for a road vehicle; the method comprising the steps of:
- generating, using a first electronic device, at least one motoring aid information item as the road vehicle travels along a road having a road surface;
- converting, using a second electronic device connected to the first electronic device, the information into a graphic display image;
- projecting, using a projector arranged in the front side of the road vehicle and connected to the second electronic device, the image onto a portion of the road surface ahead of the road vehicle, to allow the driver of the road vehicle to view the image without distracting the driver's attention from the road;
- determining, using a sensor, whether the road ahead of the road vehicle is clear; and
- projecting, using the projector, the image onto the road surface ahead of the road vehicle only if the road surface is clear.

* * * * *